US012654133B2

(12) United States Patent
Kremer

(10) Patent No.: US 12,654,133 B2
(45) Date of Patent: Jun. 16, 2026

(54) VARIABLE VOLUME CATALYST CELL FOR CATALYTIC OXIDATION OF ETHYLENE OXIDE EMISSIONS AND RELATED METHODOLOGY

(71) Applicant: CatOx, LLC., San Clemente, CA (US)

(72) Inventor: Daniel Kremer, San Clemente, CA (US)

(73) Assignee: CatOx, LLC., San Clemente, CA (US)

( * ) Notice: Subject to any disclaimer, the term of this patent is extended or adjusted under 35 U.S.C. 154(b) by 840 days.

(21) Appl. No.: 17/819,138

(22) Filed: Aug. 11, 2022

(65) Prior Publication Data

US 2024/0050894 A1     Feb. 15, 2024

(51) Int. Cl.
*B01D 53/86*        (2006.01)
*B01D 53/88*        (2006.01)

(52) U.S. Cl.
CPC ....... *B01D 53/8668* (2013.01); *B01D 53/885* (2013.01); *B01D 2255/2073* (2013.01); *B01D 2255/20761* (2013.01); *B01D 2257/708* (2013.01)

(58) Field of Classification Search
None
See application file for complete search history.

(56) References Cited

U.S. PATENT DOCUMENTS

| | | | | |
|---|---|---|---|---|
| 3,594,131 A | * | 7/1971 | Palma et al. ......... | B01D 53/944 422/219 |
| 3,598,543 A | * | 8/1971 | Crosby et al. ......... | B01D 53/86 60/299 |
| 5,229,071 A | * | 7/1993 | Meo, III .................. | A61L 2/20 422/126 |
| 2011/0236268 A1 | * | 9/2011 | Parusel ................ | B01D 53/864 422/119 |

OTHER PUBLICATIONS

Carus LLC, Carus Catalysts, <https://www.carusllc.com/markets/air-and-gas-purification/>, printed May 5, 2022, 6 pages.
Lesni, EtO-Abatement-Planl, <https://www.lesni.com/products/solutions/sterilization-with-ethylene-oxide/>, printed May 5, 2022, 3 pages.
3M, EO Abator Model 50 System, © 2021, 4 pages.
(Continued)

*Primary Examiner* — Jelitza M Perez
(74) *Attorney, Agent, or Firm* — STETINA GARRED BRUCKER & NEWBOLES

(57)         ABSTRACT

A catalyst cell includes a main body having a sidewall extending around a cavity sized to receive catalyst material. An inlet and an outlet are located at the sidewall, with both being in communication with the cavity, and the outlet being spaced from the inlet. A compaction plate is positionable within the cavity adjacent the catalyst material, with the compaction plate and the main body collectively defining a volume of the cavity. The compaction plate is moveable relative to the main body to facilitate variation in the volume of the cavity. A spring is operatively connected to the compaction plate and is configured to impart a force on the compaction plate to facilitate adjustment of the volume of the cavity in response to breakdown of catalyst material within the cavity.

12 Claims, 8 Drawing Sheets

(56) References Cited

OTHER PUBLICATIONS

Carus Air, Carulite 500 Granular Catalyst Fact Sheet, Copyright 2001 rev. May 2016, 1 page.
Lesni, Industrial Air Purification Catalytic Abatement Plant Ethylene Oxide Abatement for Medical Devices, accessed May 6, 2022, 8 pages.
Callery Chemical Company, Material Safety Data Sheet, Jun. 1999, 3 pages.

* cited by examiner

HIGH EFFICIENCY PREHEATS
CATALYST CELLS

EtO EMISSION

HIGH EFFICIENCY HEAT EXCHANGER

EXHAUST DUCK/ STACK

BLOWER

200

202

212

210

208

206

214

216

204

VARIABLE VOLUME CATALYST CELL FOR CATALYTIC OXIDATION OF ETHYLENE OXIDE EMISSIONS AND RELATED METHODOLOGY

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to catalytic oxidation, and more specifically, to a variable volume cell configured to impart a compaction force on a catalyst material to enhance the performance and efficiency of the catalytic oxidizers used for ethylene oxide emission control.

2. Description of the Related Art

Catalytic oxidizers are commonly used for ethylene oxide emission control, and include a cell filled with catalyst granules. A common problem effecting the performance of conventional catalytic oxidizers is the physical breakdown of the catalyst granules. Vibration and high process airflow through the bed of catalyst granules commonly combine to cause the granules to rub or grind against each other, which often leads to settling of the catalyst within a fixed-volume catalyst cell.

The settling of the catalyst invariably leads to the formation of voids or channels, within the bed of catalyst material (e.g., channeling). Such channels are undesirable, as they usually allow the high-flow process gas to find or create a path of least resistance, flowing through gaps created as a result of the catalyst setting, and thus, bypassing contact with the catalyst entirely. The speed of the physical breakdown may increase as the space between the granules increases and allows for more movement and physical interaction between the granules.

The physical properties of the catalyst granules commonly used in catalytic oxidizers have changed over the years. In the past, the granules were much more physically robust than current iterations of the granules, which have proven to be much more brittle or fragile. The quality of currently available catalyst granules leads to high rates of channeling, and thus, is associated with lower control efficiencies and more frequent maintenance of the associated catalytic oxidizer systems.

Accordingly, there is a need in the art for a catalyst system configured to inhibit the physical breakdown of catalyst material used in the catalyst system. Various aspects of the present disclosure address this particular need, as will be discussed in more detail below.

BRIEF SUMMARY

According to one embodiment, there is provided a catalyst cell for holding catalyst material. The catalyst cell includes a main body having a sidewall extending around a cavity sized to receive the catalyst material. An inlet and an outlet are located at the sidewall, with both being in communication with the cavity, and the outlet being spaced from the inlet. The inlet is configured to receive an exhaust gas to allow the exhaust gas to pass through the cavity, while the outlet is configured to discharge the exhaust gas after the exhaust gas has passed through the cavity. A compaction plate is positionable within the cavity adjacent the catalyst material, with the compaction plate and the main body collectively defining a volume of the cavity. The compaction plate is moveable relative to the main body to facilitate variation in the volume of the cavity. A spring or spring system is operatively connected to the compaction plate and is configured to impart a force on the compaction plate to facilitate adjustment of the volume of the cavity in response to breakdown of catalyst material within the cavity.

The compaction plate may include a mesh sheet.

The spring or spring system may include stainless steel wool compacted against the compaction plate. The catalyst cell may additionality include an outer plate positioned in opposed, spaced relation to the compaction plate, with the stainless steel wool being compacted between the compaction plate and the outer plate.

The spring or spring system may include or be comprised of one or more a coil springs.

The catalyst cell may further include a gasket connected to the compaction plate and configured to interface with the sidewall to form an effective seal or a fluid tight seal between the compaction plate and the main body, which may prevent or restrict passage of catalyst granules around the compaction plate.

The sidewall may include a non-porous surface and a mesh window formed in non-porous surface. The sidewall may additionally include a guide channel formed therein to guide the compaction plate.

According to another embodiment, there is provided an emission control system configured to receive ethylene oxide source gas emissions from a process gas stream. Through catalytic oxidation, 99% or more of the ethylene oxide may be converted into carbon dioxide and water vaper. The emission control system includes a preheater configured to apply heat to the process gas stream. A catalyst cell is located downstream of the preheater and includes a main body having a sidewall extending around a cavity sized to receive the catalyst material. An inlet is formed at the sidewall and in communication with the cavity and configured to receive an exhaust gas to allow the exhaust gas to pass through the cavity. An outlet is also formed at the sidewall in spaced relation to the inlet and in communication with the cavity to discharge the exhaust gas after the exhaust gas has passed through at least a portion of the cavity. A compaction plate is positionable within the cavity adjacent the catalyst material. The compaction plate and the main body collectively define a volume of the cavity, the compaction plate being moveable relative to the main body to facilitate variation in the volume of the cavity. A spring or spring system is operatively connected to the compaction plate and is configured to impart a force on the compaction plate to facilitate adjustment of the volume of the cavity in response to breakdown of catalyst material within the cavity.

The emission control system may additionally include a heat exchanger configured to receive source gas emissions from a first inlet and controlled emissions from the catalyst cell to facilitate heat transfer from the outlet gas stream to the unheated gas stream. The heat exchanger may additionally include a second inlet separate from the first inlet, with the second inlet being configured to receive gas from an ambient source. A first damper may be associated with the first inlet and a second damper may be associated with the second inlet. Each of the first and second dampers may be selectively transitional between an open position and a closed position, with gas flow through the respective first and second inlets being restricted as the first and second dampers transition from the open position toward the closed position.

The preheater may be configured to heat the inlet gas stream to a prescribed temperature. The prescribed temperature may be between 300-350 degrees Fahrenheit.

The gas purification system may include at least one deflection plate upstream of the preheater and configured to direct at least a portion of the inlet gas stream flow in a prescribed direction.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of a catalytic oxidizer and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Various aspects of the present disclosure relate to a variable-volume catalytic oxidizer cell (e.g., catalyst cell), particularly suitable for ethylene oxide emission control. The catalyst cell may include a spring-loaded wall or plate configured to provide constant physical pressure on catalyst material located within the cell by reducing the volume of the catalyst cell. The reduced volume minimizes the room the catalyst granules have to move relative to each other, which mitigates undesirable grinding of the granules. While there may be minor compaction of the granule bed over time, the spring-loaded plate may provide exponential slowing of the physical catalyst granule breakdown, compared to conventional, fixed volume catalyst cells. Furthermore, the reduced grinding of the granules may substantially reduce or eliminate the occurrence of channeling through the granule bed.

It is contemplated that various implementations of the catalyst cell may be scalable to accommodate various sizes and capacity, although in all cases, the catalyst cell includes a spring-loaded plate or wall to allow for variation of the volume of the catalyst cell to provide continuous compaction to the catalyst granules located within the catalyst cell.

Figure 1:
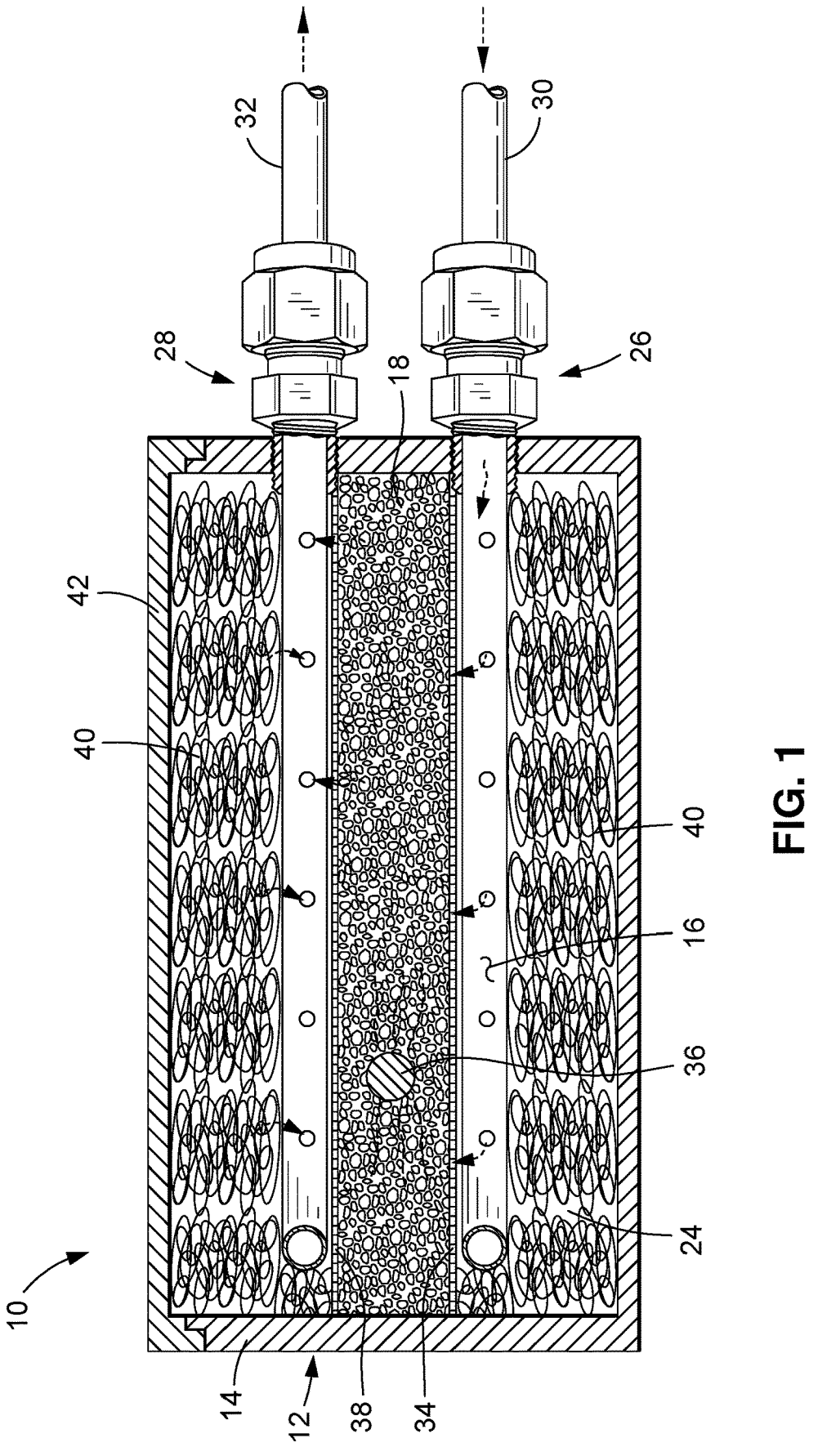
FIG. 1 is a cross sectional view of a catalytic cell having a spring-loaded compression plate configured to apply a compressive force to an underlying bed of catalytic granules.
Figure 2:
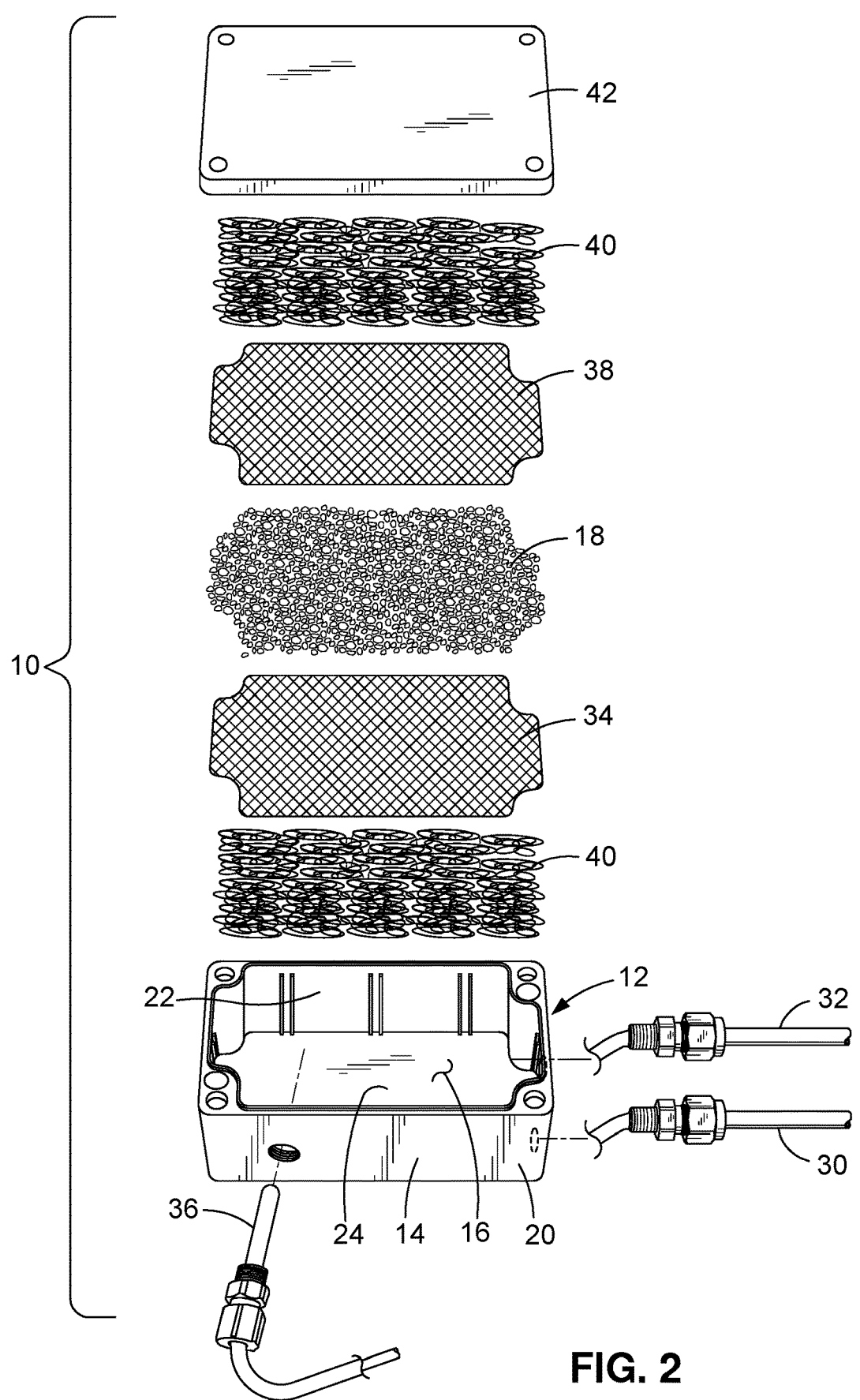
FIG. 2 is an exploded upper perspective view of the catalytic cell of FIG. 1.
Figure 3:
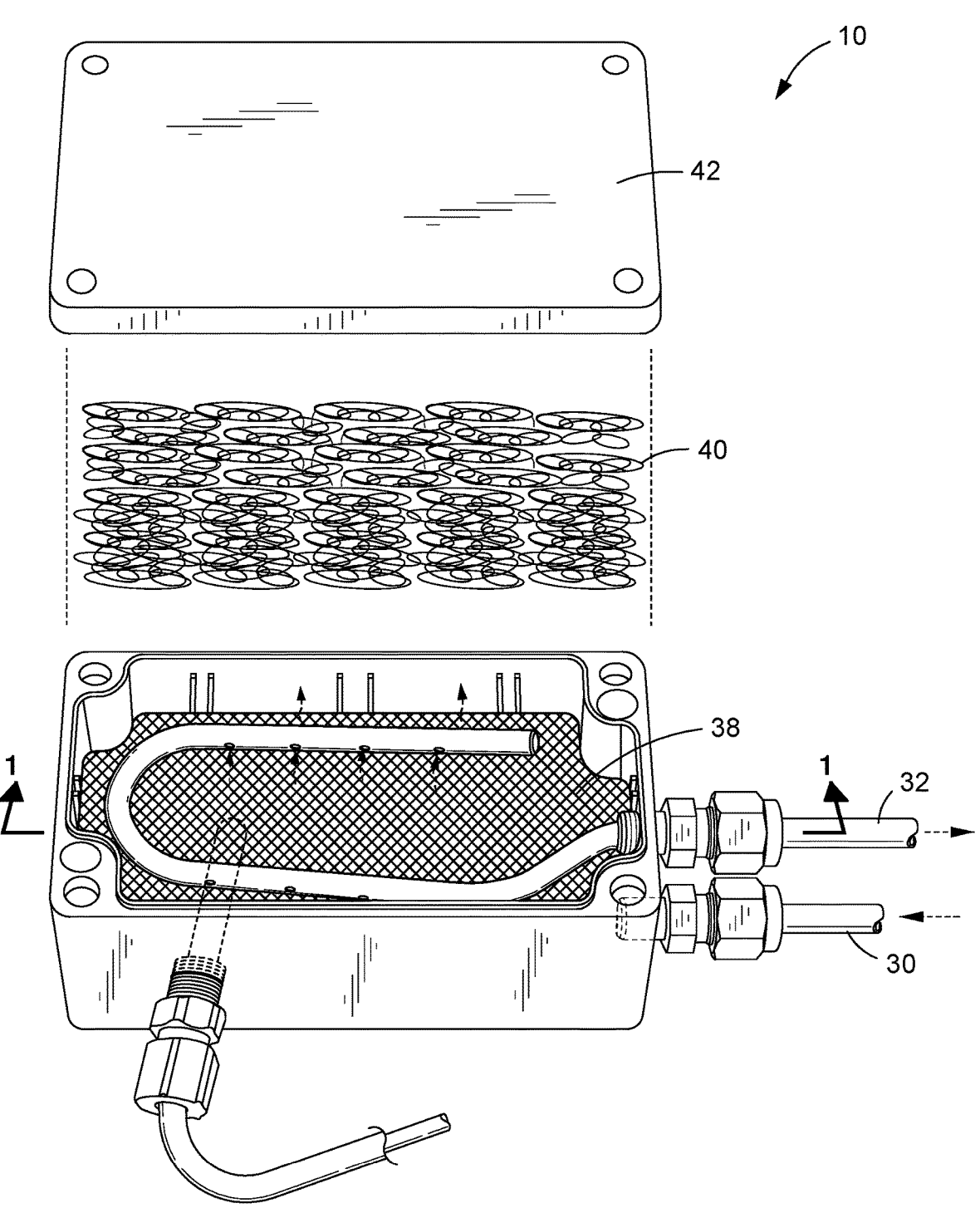
FIG. 3 is a partial exploded upper perspective view of the catalytic cell of FIG. 1.

A first implementation of catalyst cell 10 is depicted in FIGS. 1-3, and may be intended for small flow rates, such as 0.25-2.0 CFM, and more particularly, 0.5 CFM. The catalyst cell 10 includes a main body 12 having a sidewall 14 extending around a cavity 16 sized to receive the catalyst material 18. The sidewall 14 depicted in FIGS. 1-3 is generally quadrangular in configuration, and includes an outer surface 20 and an inner surface 22. The inner surface 22 and a bottom wall 24 collectively define the cavity 16. Although the exemplary sidewall 14 is quadrangular, it is contemplated that other embodiments may include a sidewall 14 that is of a different shape or configuration, such as a rounded configuration.

The catalyst cell 10 may additionally include an inlet 26 which delivers a gas (e.g., ethylene oxide) for purification, as well as an outlet 28, through which gas that has been purified may be discharged from the catalyst cell 10. The inlet 26 and the outlet 28 may each include one or more openings formed within the sidewall 14 and in communication with the cavity 16. In the exemplary embodiment, the inlet 26 includes an inlet plenum 30 in communication with an inlet opening formed in the sidewall 14. The outlet 28 includes an outlet plenum 32 in communication with an outlet opening formed in the sidewall 14 in spaced relation to the inlet opening. The inlet 26 and outlet 28 may be formed on opposite sides of the catalyst material 18, such that unpurified gas may be delivered via the inlet 26, may pass through the catalyst material 18 to become purified gas, and then may be discharged from the catalyst cell 10 via the outlet 28.

A lower support plate 34 or screen extends through the cavity 16 and may be supported by the sidewall 14. The lower support plate 34 may be configured to support the bed of catalyst material 18 over the lower support plate 34, while also being porous or perforated to allow unpurified gas to flow through the lower support plate 34 and into the bed of catalyst material 18. The lower support plate 34 may be of sufficient rigidity to maintain a generally planar configuration (e.g., avoids excessive sagging), while supporting the weight of the catalyst material 18, as well as the compaction force applied to the catalyst material 18. In some embodiments, the lower support plate 34 may be a mesh screen. A layer of stainless steel wool, or other material known in the art, may occupy the space between the lower wall of the main body 12 and the lower support plate 34, which may provide additional support to the lower support plate 34. However, it is contemplated that certain embodiments may be formed without a lower support plate 34, and instead, a lower wall of the main body 12 may function as the lower support plate 34.

The catalyst material 18 may include a manganese-based catalyst. An example of a catalyst includes CARULITE® catalyst provided by Carus, LLC. Such catalysts may be formed from Manganese dioxide and copper oxide. However, other catalyst material known in the art may also be used without departing from the spirit and scope of the present disclosure.

A heating element 36 may be embedded in the catalyst material 18 or placed adjacent the catalyst material 18 to provide heat, as may be desired during the purification process. In this regard, heating of the gas that is to be purified may facilitate the purification process.

A compaction plate 38 is positionable within the cavity 16 adjacent the catalyst material 18, with the compaction plate 38 and the main body 12 collectively defining an operative volume of the cavity 16. The compaction plate 38 is moveable relative to the main body 12 to facilitate variation in the volume of the cavity 16. In this regard, from the perspective shown in FIG. 1, the volume of the cavity 16 may be decreased by pressing the compaction plate 38 in a downward direction relative to the sidewall 14 (e.g., against the bed of catalyst material 18). Conversely, the volume of the cavity 16 may be increased by moving the compaction plate 38 in an upward direction relative to the sidewall 14. Thus, the ability of the compaction plate 38 to move relative to the sidewall 14 allows for variation in the size of the cavity 16, which may be related to the size of the bed of catalyst material 18. The compaction plate 38 may include a mesh sheet or materials capable of compacting the catalyst material 18, while also allowing purified gas to flow therethrough.

A spring 40 is operatively connected to the compaction plate 38 and is configured to impart a force on the compaction plate 38 to facilitate adjustment of the volume of the cavity 16 in response to breakdown of catalyst material 18 within the cavity 16.

In one embodiment, the spring 40 may include steel wool compacted against the compaction plate 38. A lid or outer plate 42 may be used to compact the steel wool 40 against the compaction plate 38. In this regard, the steel wool may be capable of transitioning between a neutral configuration and a compressed configuration. Placing the outer plate 42 on the steel wool may cause the steel wool 40 to transition from its neutral configuration toward the compressed configuration, and the inherent resiliency of the steel wool may cause the downward force applied to the compaction plate 38 to increase in response to transition of the steel wool from the neutral configuration toward the compressed configuration.

Although the exemplary embodiment shows the spring 40 as being formed from steel wool, it is contemplated that other spring elements may be used to apply the spring force to the compaction plate 38. For instance, the spring 40 may be a coil spring, a leaf spring, or other elements capable of imparting a compacting force against the compaction plate 38.

Figures 4, 5:
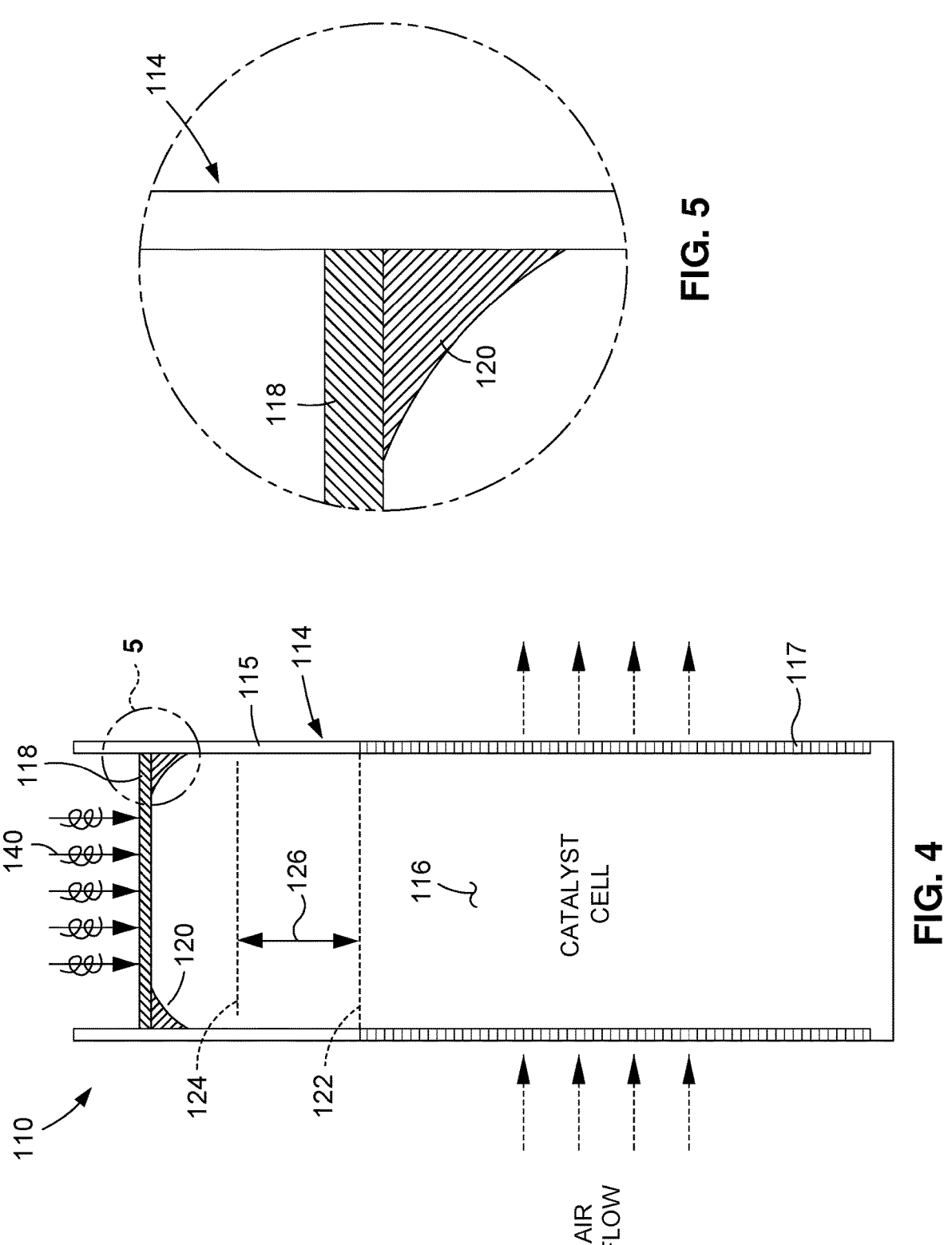
FIG. 4 is a cross sectional side view of another embodiment of a catalyst cell.
FIG. 5 is an enlarged view taken from FIG. 4, depicting a wiper seal between a spring loaded top plate and a sidewall of the catalyst cell.

Referring now to FIGS. 4 and 5, there is depicted another embodiment of a catalyst cell 110 configured to allow for lateral, purifying gas flow therethrough. In this regard, from the perspective depicted in FIG. 4, flow moves from the left side to the right side, although, flow can move in any horizontal direction relative to the catalyst cell 110. The catalyst cell 110 includes a sidewall 114 defining internal cavity 116, which is sized to receive the catalyst material (not shown in FIGS. 4 and 5). The sidewall 114 includes a non-porous portion 115, and a porous portion 117, with the porous portion 117 being configured to facilitate gas flow into the cavity 116, as well as out of the cavity 116. In one embodiment, the porous portion 117 may be formed from on or more mesh windows, while the non-porous portion 115 may be formed from metal. It is contemplated that at least the inner surface of the non-porous portion 115 may be lined with Teflon™ or similar materials known in the art. In one iteration, the mesh windows may be approximately 6.5 inches in width and approximately 12.5 inches in height. A frame of approximately 0.75-1.0 inches may be used to frame in each window section. Furthermore, in one particular implementation, the non-porous portion 115 may have a thickness of approximately 0.12 inches, while the porous portion 117 may have a thickness of approximately 0.030 inches.

The catalyst cell 110 may further include a top plate 118 (e.g., compaction plate) moveable relative to the sidewall 114. One or more springs 140 are in operative communication with the top plate 118 to apply a force on the top plate 118 to urge the top plate 118 toward the catalyst material within the cavity 116. The springs 140 may be captured between a cover or lid (not shown) and the compaction plate 118, with the cover or lid providing a surface which may be immoveable relative to the sidewall 114 when connected thereto. Thus, the springs 140 may be compressed between the cover or lid and the top plate 118 to impart the compacting force against the top plate 118.

The sidewall 114 may additionally include a guide channel formed therein to guide the top plate 118. In this regard, the top plate 118 may include a flange or tongue that extends into the guide channel to maintain a desired orientation of the top plate 118 relative to the sidewall 114.

A semi-rigid scraper/gasket 120 may be connected to the top plate 118 and may be configured to interface with the sidewall 114 to form a fluid tight seal between the compaction plate and the sidewall 114 and to prevent any residual catalyst material from leaving the cavity 116.

Reference lines 122 and 124 are also shown, with reference line 122 being associated with a minimum catalyst depth, and reference line 124 being associated with a catalyst fill line. The minimum catalyst depth 122 may be defined by an edge of the porous portion 117 of the sidewall 114. In this regard, the catalyst cell 110 may be filled with enough catalyst material such that the catalyst material covers the porous portion 117 (e.g., the mesh screen/window). Arrow 126 represents the distance between the minimum catalyst depth 122 and the catalyst fill line 124, which is a maximum allowed distance of travel of the spring-loaded top plate 118 so that a sufficient compaction force is maintained. In this regard, if catalyst material is filled to the catalyst fill line 124, the bottom of the compaction plate 118 would reside at the fill line (or slightly above the line, in abutting contact with the catalyst. If catalyst breakdown occurs over time, the upper line of the catalyst bed may decrease, yet the force applied by the springs 140 would press the top plate 118 lower to maintain the abutting contact with the catalyst material.

It is contemplated that a catalytic cell having a spring-loaded plate may be integrated into a sterilizing system capable of handling a prescribed flow rate. In this regard, the catalytic cell may be scalable for use in various systems that differ in their associated flow rate.

Figure 6:
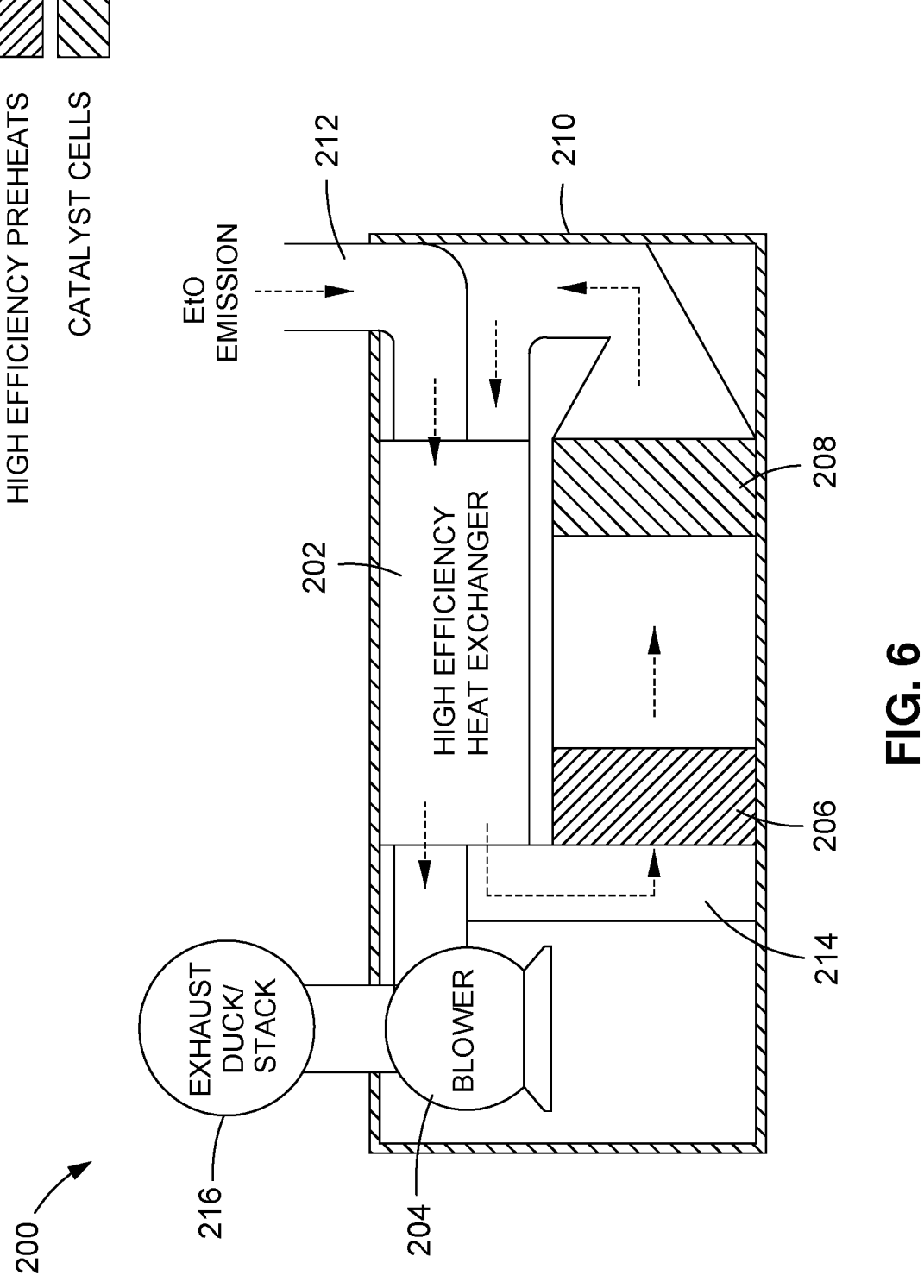
FIG. 6 is a top, schematic view of a first catalytic oxidizing system including a catalytic cell having a spring-loaded plate to provide compaction to catalyst located therein.

Referring now to FIG. 6, there is depicted a top view of an exemplary system 200, which may be suitable for achieving a flow rate of approximately 100 cubic feet per minute (CFM). The system 200 generally includes a heat exchanger 202, a blower 204, a pre-heater 206, and a catalytic cell 208, all located within an enclosure or housing 210. The enclosure 210 may be formed from stainless steel or other materials known in the art. The enclosure 210 may have a hinged lid configured to be selectively raised or lowered relative to a sidewall of the enclosure 210, similar to a conventional car hood. The lid may be held up by a support strut, or the hinge may be configured to retain the hood in the raised position to allow for visual inspection of the system 200. The lid may be closed during normal operation of the system 200. The size of the enclosure may be 4 feet in width, 2 feet in depth, and 3 feet in height.

The enclosure 210 may have an inlet 212 configured to receive cool, unpurified gas (e.g., ethylene oxide ExO emission). The inlet 212 may feed into the high efficiency heat exchanger 202, wherein the cool, unpurified gas may receive heat from heated, purified gas prior to purified gas being exhausted from the system 200. After the unpurified gas is warmed by the heat exchanger 202, the unpurified gas may be further heated by the high efficiency preheater 206. A duct or plenum 214 may extend between the heat exchanger 202 and the preheater 206 to facilitate transfer of the unpurified gas therebetween.

The heated, unpurified gas may pass through a catalyst cell 208 having a spring-loaded top plate, as described in more detail above (e.g., catalyst cell 208 may include some or all of the attributes of catalyst cell 110 discussed above). As the gas passes through the catalyst cell 208, the gas becomes purified. The purified gas exits the catalytic cell 208, and passes through the heat exchanger 202, where it is cooled by transferring heat to cool, unpurified gas that has been received into the system 200. After the purified gas is cooled, the purified gas is exhausted through a duct or exhaust stack 216.

In one embodiment, the catalytic cell 208 is 12 inches in width, 6 inches in depth, and 24 inches in height. The catalyst cell 208 may include a hinged, insulated lid to facilitate visual inspection of the granules within the catalyst cell 208. The catalyst cell 208 may be sized to hold approximately 50 pounds of catalyst within the cell 208.

Figure 7:
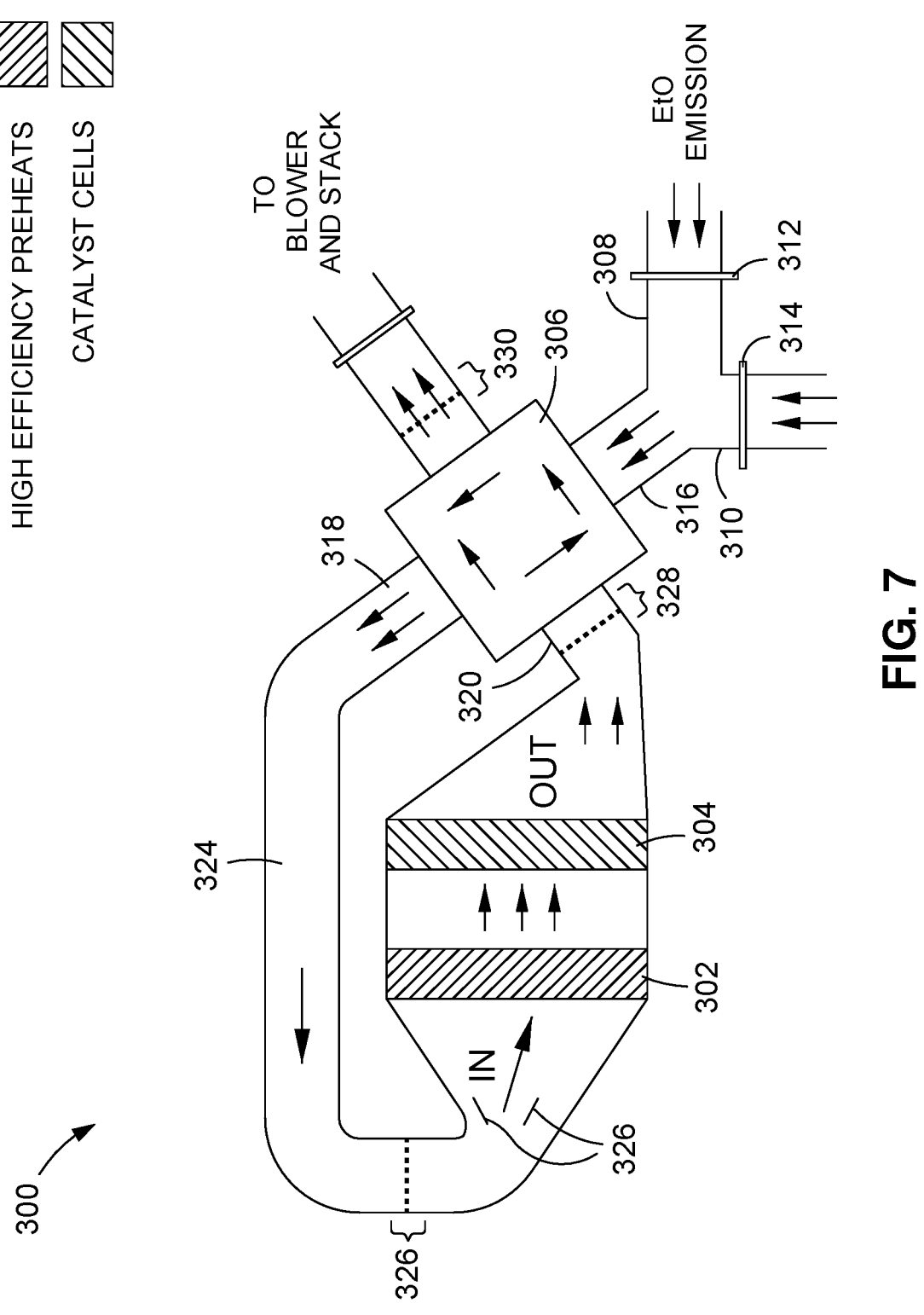
FIG. 7 is a top, schematic view of a second catalytic oxidizing system including a catalytic cell having a spring-loaded plate to provide compaction to catalyst located therein.

Referring now to FIG. 7, there is depicted a top view of an exemplary system 300, which may be suitable for achieving a flow rate of approximately 5000 CFM. The system 300 may be modular in nature (e.g., a modular catalytic cell unit (MCCU) 300) such that multiple MCCU's 300 may be combined with each other to achieve a customized catalytic oxidizing system in 5000 CFM increments.

Each MCCU 300 may include a high efficiency preheater 302, a catalyst cell 304, and a high efficiency, plate-style heat exchanger 306. The modular design may lower part costs and overall production cost. The modular design may also enable variation in the layout, which may facilitate optimization of the user's available space. For instance, the MCCU's 300 may be arranged horizontally or stacked vertically, with each MCCU 300 being built onto a skid that can be lifted into place. A ladder or catwalk may be built over the system to allow for inspection and service.

The system 300 includes an inlet 308 for unpurified gas, as well as an ambient inlet 310 through which ambient air may be drawn into the system 300. Each inlet 308, 310 includes a slide gate damper 312, 314 that allows for selective opening or closing of the respective inlet 308, 310, as may be desired for different operational modes. For instance, in a normal operational mode, the ambient inlet 310 may be closed by closing slide gate damper 314, while the unpurified gas inlet 308 may be opened, by opening the slide gate damper 312. However, in a cool-down mode, the ambient inlet 310 may be opened by opening the slide gate damper 314, and the unpurified gas inlet 308 may be closed by closing the slide gate damper 312 to allow the system 300 to cool down for service.

The unpurified inlet 308 and the ambient inlet 310 may be connected to each other at a primary heat exchanger inlet 316. In this regard, the primary heat exchanger inlet 316 is supplied by the unpurified inlet 308 and/or the ambient inlet 310. The heat exchanger 306 may also include an unpurified outlet 318, a purified inlet 320 and a purified outlet 322.

The unpurified outlet 318 is in communication with a fluid passageway 324 that extends between the heat exchanger 306 and the preheater 302. In one embodiment, the preheater 302 may be capable of heating the unpurified gas to approximately 300-350 degrees Fahrenheit. Deflector panels 326 may be placed in the passageway 324 slightly upstream of the preheater 302 to ensure even distribution of gas into the preheater 302.

Downstream of the preheater 302 is a catalyst cell 304 having a spring-loaded top plate. In this regard, catalyst cell 304 may include many, if not all, of the attributes of catalyst cell 110 discussed above. In one embodiment, the catalyst cell 304 is approximately 8.5 feet in height, 6 feet in width and 1 foot in depth, and is configured to hold approximately 2500 pounds of catalyst.

The catalyst cell 304 may include a vibration plate to allow the catalyst cell 304 to be hung from hard-point bolts on an inspection/service side of the catalyst cell 304 for use during emptying and filling of the catalyst cell 304. The bottom of the catalyst cell may be slightly sloped toward a catalyst vacuum port.

Various sampling manifolds may be integrated into the system to allow for extraction of gas at various locations for testing. In the exemplary embodiment, there is an inlet sampling manifold 326 upstream of the preheater 302, as well as outlet sampling manifolds 328, 330 both upstream and downstream of the heat exchanger 306.

The footprint of the system 300 may be 9 feet by 15 feet and 12 feet in height.

The modular configuration and combinability of the MCCU's 300 and the use of a spring-loaded top plate in the catalyst cell 304 may greatly reduce or eliminate shutdowns of the overall system. In this regard, although one MCCU 300 may be inactive for servicing, the remaining MCCUs may remain active.

Figure 8:
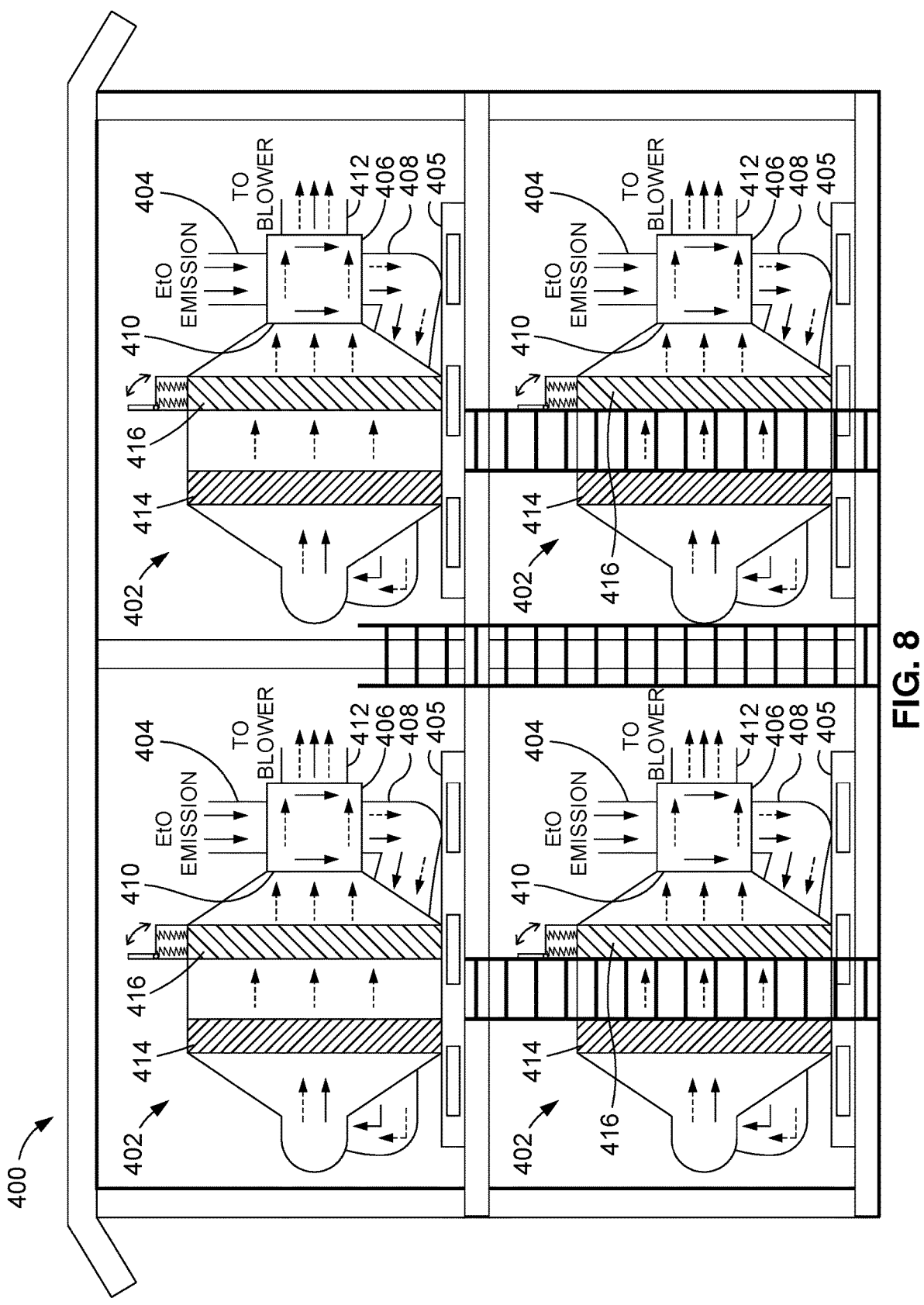
FIG. 8 is a side, schematic view of a third catalytic oxidizing system including a catalytic cell having a spring-loaded plate to provide compaction to catalyst located therein.

Referring now to FIG. 8, there is depicted a side view of an exemplary system 400, is a modular system that allows for several MCCUs 402 (e.g., modules) to be combined to achieve a desired flow rate. In the exemplary embodiment, each MCCU 402 may have a process flow capacity of approximately 5000 CFM, and thus, the overall flow capacity of the exemplary system is 20,000 CFM. However, by including fewer MCCUs 402, the overall flow rate capacity may be lower than 20,000 CFM, and conversely, by adding more MCCUs 402, the overall flow rate capacity may be above 20,000 CFM. Thus, the modular nature of the system 400 allows for selective configuration to accommodate the flow capacity requirements and space requirements of a given implementation.

The MCCU's 402 may be configuration to facilitate combination in various implementations, such as sharing a common exhaust blower and discharge stack to achieve the desired total process flow capacity. Each MCCU 402 may be built onto a skid 405 that can be craned or forklifted into plate. The footprint of each skid may be 9 feet by 15 feet, although other sizes and shapes may be used without departing from the spirit and scope of the present disclosure.

Each MCCU includes an inlet 404, which delivers unpurified gas to a high efficiency heat exchanger 406, which allows for heat transfer between cooler unpurified gas and hotter purified gas. The heat exchanger 406 includes an unpurified outlet 408, as well as purified inlet 410 and a purified outlet 412. As the unpurified gas flows through the heat exchanger 406, it is warmed, and then the unpurified gas exits via the unpurified outlet 408, which leads to a purification flow network.

The purification flow network includes a duct extending from the heat exchanger 406 and leading to a high efficiency preheater 414, which may preheat the unpurified gas to approximately 300 degrees Fahrenheit. The preheated, unpurified gas then flows through a catalyst cell 416 to become purified gas. The catalyst cells 416 may include many, if not all, of the attributes of the catalyst cell 110 described above.

The catalyst cells 416 may include an insulated hinged lid for inspection of the position of the top plate within the catalyst cell 416. Each catalyst cell 416 may be 8.5 feet in height, 6 feet in width, and 1 foot in diameter. The catalyst cells 416 may be sized to hold approximately 2500 pounds of catalyst in each cell.

A passageway extends from the catalyst cell 416 to the heat exchanger 406, such that the hot, purified gas enters the heat exchanger 406 through the purified inlet 410. The purified gas enters the heat exchanger 406 through the purified inlet 410 and flows through the heat exchanger 406 to warm the cooler unpurified gas entering the system 400. A blower may control the flow of gas through the MCCU 402 and may urge the purified gas to exit the heat exchanger 406 through an exhaust/stack.

The system 400 may include one or more ladders and/or elevated inspection platforms adjacent each catalyst cell 416 to facilitate inspection of the top plate position within each catalyst cell 416.

Figure 9:
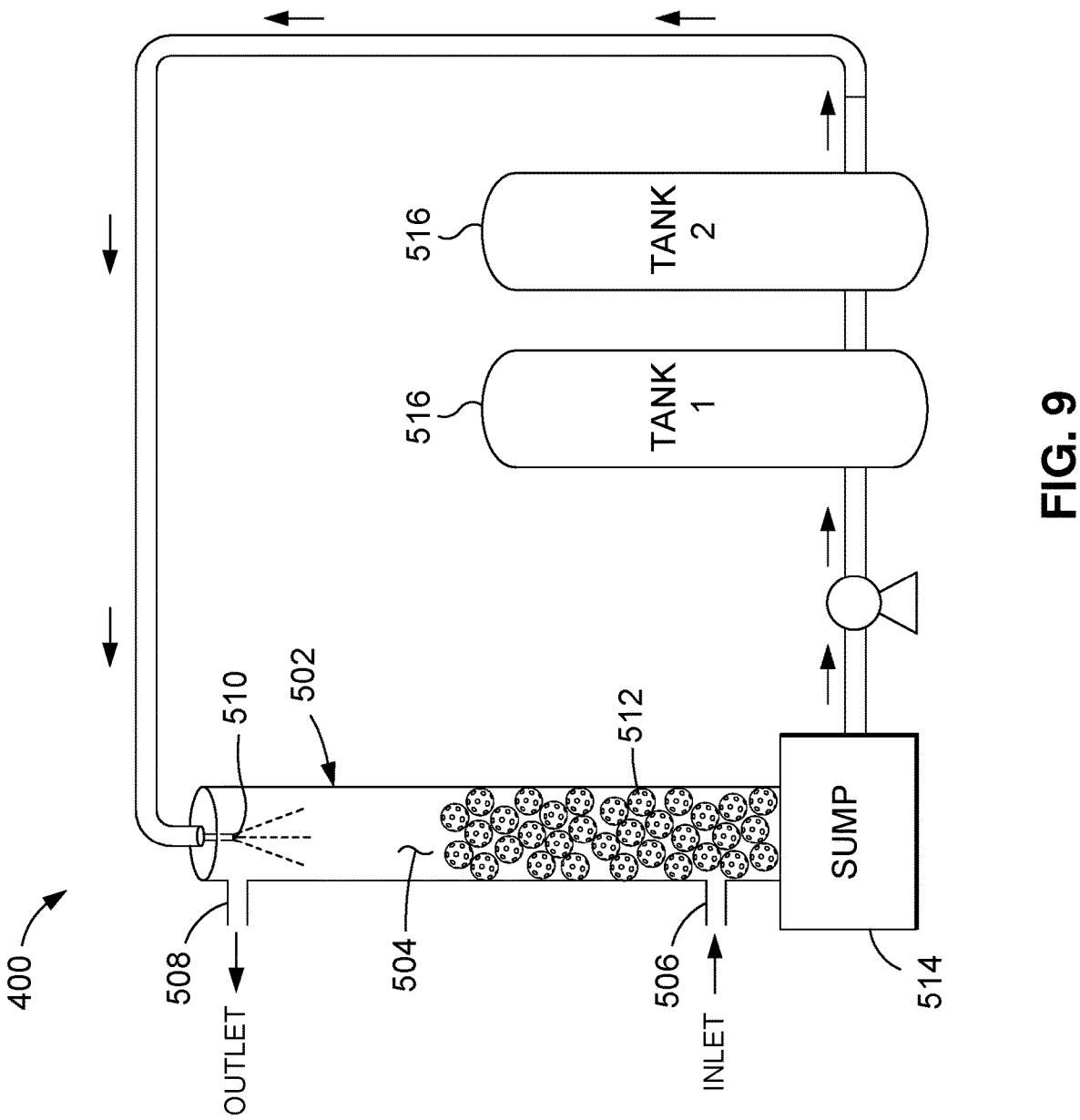
FIG. 9 is a schematic view of a gas purification system using a water scrubbing tower.

Referring now to FIG. 9, there is depicted another embodiment of a purification flow system 500, which may be particularly suitable for a high concentration, low flow stream of contaminated gas. Based on the characteristics of such flows, it may be desirable to conduct multiple stages of purification. The system used in FIG. 9 may be used in a first-stage purification process, prior to a second-stage purification process which may include the use of the catalyst cells described above.

The system 500 generally includes a scrubber tower 502 having an internal cavity 504, a gas inlet 506 and a gas outlet 508, both of which are in fluid communication with the internal cavity 504. Unpurified gas may be introduced into the internal cavity 504 through the gas inlet 506, and purified gas may exit the internal cavity 504 through the gas outlet 508. The scrubber tower 502 additionally includes, or is aligned with, a spray nozzle 510 capable of spraying water into the internal cavity 504. As the water contacts the unpurified gas, ethylene oxide may be drawn from the gas into the water, thereby purifying the gas.

The internal cavity 504 may be partially filled with a packing material 512 configured to increase the surface area contact between the water and the unpurified gas. In one particular implementation, the packing material 512 may include hollow spheres, with outer surface of the spheres being perforated with holes or openings, e.g., similar to a conventional whiffle ball. The perforated, hollow, spherical configuration allows the unpurified gas to flow through the sphere and contact the wet surfaces of the sphere, which have been sprayed with water from the water inlet.

As noted above, the system 500 may be intended for use in a multi-stage purification process. Therefore, the purified gas may exit via the outlet 508, and then may proceed to further purification using any of the purification systems described above.

The water may flow downwardly through the internal cavity 504, as the result of gravity, and may accumulate in the bottom of the internal cavity 504. The accumulated water may be recirculated by a pump 514, and may be temporarily stored in one or more storage tanks 516 fluidly connected to the water supply network. In this regard, water supplied to the spray nozzle 510 may be drawn from one of the tanks 516.

It is understood that any dimension or measurement provided herein is for example, and not for purposes of limitation. Furthermore, the dimensions may be associated with a tolerance acceptable in the art, such as about 5%.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A gas purification system configured to receive unpurified gas and process the gas to create purified gas having desired compositional characteristics, the gas purification system comprising:

a preheater configured to apply heat to the unpurified gas;

a catalyst cell downstream of the preheater, the catalyst cell comprising:

a main body having a sidewall extending around a cavity sized to receive a catalyst material, a sidewall inlet at the sidewall and in communication with the cavity and configured to receive the unpurified gas to allow the unpurified gas to pass through the cavity, and an outlet at the sidewall in spaced relation to the sidewall inlet and in communication with the cavity to discharge purified gas after passing through at least a portion of the cavity;

a compaction plate positionable within the cavity adjacent the catalyst material, the compaction plate and the main body collectively defining a volume of the cavity, the compaction plate being moveable relative to the main body to facilitate variation in the volume of the cavity; and a spring operatively connected to the compaction plate and configured to impart a force on the compaction plate to facilitate adjustment of the volume of the cavity in response to breakdown of catalyst material within the cavity; and a heat exchanger configured to receive the unpurified gas from an unpurified inlet and the purified gas from the catalyst cell to facilitate heat transfer from the purified gas to the unpurified gas, the heat exchanger further comprising an ambient inlet separate from both the unpurified inlet and the sidewall inlet configured to receive ambient gas from an ambient source.

2. The gas purification system recited in claim 1, further comprising a first damper associated with the unpurified inlet and a second damper associated with the ambient inlet, each of the first and second dampers being selectively transitional between an open position and a closed position, gas flow through the respective unpurified and ambient inlets being restricted as the first and second dampers transition from the open position toward the closed position.

3. The gas purification system recited in claim 1, wherein the heat exchanger includes a first unpurified outlet in fluid communication with the preheater and the catalyst cell.

4. The gas purification system recited in claim 1, wherein the preheater is configured to heat the unpurified gas to a prescribed temperature.

5. The gas purification system recited in claim 4, wherein the prescribed temperature is between 300-350 degrees Fahrenheit.

6. The gas purification system recited in claim 1, further comprising at least one deflection plate upstream of the preheater and configured to direct at least a portion of the unpurified gas flow in a prescribed direction.

7. The gas purification system recited in claim 1, wherein the spring is a coil spring.

8. A gas purification system configured to receive unpurified gas and process the gas to create purified gas having desired compositional characteristics, the gas purification system comprising:

a preheater configured to apply heat to the unpurified gas;

a catalyst cell downstream of the preheater, the catalyst cell comprising:

a main body having a sidewall extending around a cavity sized to receive a catalyst material, a sidewall inlet at the sidewall and in communication with the cavity and configured to receive the unpurified gas to allow the unpurified gas to pass through the cavity, and an outlet at the sidewall in spaced relation to the sidewall inlet and in communication with the cavity to discharge purified gas after passing through at least a portion of the cavity;

a compaction plate positionable within the cavity adjacent the catalyst material, the compaction plate and the main body collectively defining a volume of the cavity, the compaction plate being moveable relative to the main body to facilitate variation in the volume of the cavity; and a spring operatively connected to the compaction plate and configured to impart a force on the compaction plate to facilitate adjustment of the volume of the cavity in response to breakdown of catalyst material within the cavity; and a heat exchanger comprising a first unpurified outlet in fluid communication with the preheater and the catalyst cell, the heat exchanger being configured to receive the unpurified gas from an unpurified inlet and the purified gas from the catalyst cell to facilitate heat transfer from the purified gas to the unpurified gas.

9. The gas purification system recited in claim 8, wherein the preheater is configured to heat the unpurified gas to a prescribed temperature.

10. The gas purification system recited in claim 9, wherein the prescribed temperature is between 300-350 degrees Fahrenheit.

11. A gas purification system configured to receive unpurified gas and process the gas to create purified gas having desired compositional characteristics, the gas purification system comprising:

a preheater configured to apply heat to the unpurified gas;

a catalyst cell downstream of the preheater, the catalyst cell comprising:

a main body having a sidewall extending around a cavity sized to receive a catalyst material, a sidewall inlet at the sidewall and in communication with the cavity and configured to receive the unpurified gas to allow the unpurified gas to pass through the cavity, and an outlet at the sidewall in spaced relation to the sidewall inlet and in communication with the cavity to discharge purified gas after passing through at least a portion of the cavity;

a compaction plate positionable within the cavity adjacent the catalyst material, the compaction plate and the main body collectively defining a volume of the cavity, the compaction plate being moveable relative to the main body to facilitate variation in the volume of the cavity; and a spring operatively connected to the compaction plate and configured to impart a force on the compaction plate to facilitate adjustment of the volume of the cavity in response to breakdown of catalyst material within the cavity; and at least one deflection plate upstream of the preheater and configured to direct at least a portion of the unpurified gas flow in a prescribed direction.

12. The gas purification system recited in claim 11, wherein the spring is a coil spring.

\* \* \* \* \*